(12) United States Patent
Lin et al.

(10) Patent No.: US 7,518,330 B2
(45) Date of Patent: Apr. 14, 2009

(54) PROTECT-CONTROL DEVICE CAPABLE OF LIMITING CURRENT FOR REDUCING NOISE RESULTLING FROM SWITCHOVER OF MOTOR

(75) Inventors: Jao-Ching Lin, Taipei (TW); Lin-Abel Chu, Taipei (TW); You-Kang Lin, Taipei (TW); Cheng-Chung Tsau, Taipei (TW); Chung-Yi Shen, Taipei (TW)

(73) Assignee: Sentelic Corporation, Taipei (TW)

( * ) Notice: Subject to any disclaimer, the term of this patent is extended or adjusted under 35 U.S.C. 154(b) by 71 days.

(21) Appl. No.: 11/685,652

(22) Filed: Mar. 13, 2007

(65) Prior Publication Data

US 2008/0253750 A1    Oct. 16, 2008

(51) Int. Cl.
*G05B 11/28* (2006.01)
(52) U.S. Cl. .................... 318/599; 318/434; 388/811
(58) Field of Classification Search ................ 318/257, 318/254, 434, 599; 388/811
See application file for complete search history.

(56) References Cited

U.S. PATENT DOCUMENTS

| 6,448,724 | B1* | 9/2002 | Kleinau et al. | 318/400.25 |
| 7,064,510 | B2* | 6/2006 | Brannen et al. | 318/400.3 |
| 7,141,943 | B2* | 11/2006 | Song et al. | 318/400.34 |
| 7,276,867 | B2* | 10/2007 | Alberkrack et al. | 318/400.24 |

* cited by examiner

*Primary Examiner*—Walter Benson
*Assistant Examiner*—Antony M Paul

(57) ABSTRACT

A protect-control device capable of limiting current for reducing noise resulting from switchover of a motor includes a motor coil set, a driving unit, a sensing unit and a control unit. The motor coil set constitutes a motor. The driving unit is electrically connected to the motor coil and provides a driving level to pass through the motor coil for driving the motor. The sensing unit is electrically connected to the motor coil set, provides a preset reference level, detects the driving level, compares the driving level to the preset reference level and outputs identifying signal. The control signal is electrically connected to the driving unit, the sensing unit and a Hall component, adjusts the driving level based on the identifying signal for driving unit output maintaining a basic duty cycle.

4 Claims, 8 Drawing Sheets

PROTECT-CONTROL DEVICE CAPABLE OF LIMITING CURRENT FOR REDUCING NOISE RESULTLING FROM SWITCHOVER OF MOTOR

BACKGROUND OF THE INVENTION

1. Field of the Invention

The present invention is related to a protect-control device capable of limiting current for reducing noise resulting from switchover of motor and particularly to a device capable of restricting noise of a running motor by means of limiting driving voltage level of the motor.

2. Brief Description of the Related Art

The conventional art usually employs pulse width modulation signal (PWM) to control conducting time of the coil set in a cooling fan motor so as to control rotation of the cooling fan motor. Further, different rotational speeds can be controlled in accordance with different duty cycles of the PWM signal. However, amplitude, frequency and duty cycle of the PWM are variables to affect the rotational speed of the fan motor.

Besides, referring to FIG. 1, the first conventional circuit is illustrated. The first conventional circuit includes a reverse voltage protective diode 101, a Hall component 102, a driving component 103, a first transistor 104, a second transistor 105, a first resistance 106, a second resistance 107, a third resistance 108 with a first motor coil set 109, a second motor coil set 120, a fourth resistance 121, a fifth resistance 122, a third transistor 123 and a fourth transistor 124. The Hall component 102, the driving component 103, the first transistor 104, the second transistor 105, the first resistance 106, the second resistance 107, the third resistance 108, the first motor coil set 109 and the second motor coil set 120 constitute a driving circuit 10.

When the power is conducted to the circuit via the reverse voltage protective diode 101, the Hall component 102 of the driving circuit 10 detects the magnetic pole change of the rotor to produce positive voltage H+ and negative voltage H− outputting to the driving component 103. The driving component 103 transforms the preceding voltages as control signal source being output to the first transistor 104 and the second transistor 105 via the first output end OUT1 and the second output end OUT2 respectively. A PWM signal from PWM input end passes through the fourth resistance 121, the fifth resistance 122 and both collectors of the third transistor 123 and fourth transistor 124 to cut off control signal sources of the first output end OUT1 and the second output end OUT2 such that the first motor coil set 109 and the second motor coil set 120, which are connected to collectors of the first transistor 104 and the second transistor 105 respectively, are controlled for changing the rotational speed of the fan motor.

Referring to FIG. 2, the second conventional circuit is illustrated. The second conventional circuit includes a reverse voltage protective diode 201, a Hall component 202, a driving component 203, a first transistor 204, a second transistor 205, a first resistance 206, a second resistance 207, a third resistance 208, a first motor coil set 209, a second motor coil set 220, a fourth resistance 221 and a third transistor 222. The Hall component 202, the driving component 203, the first transistor 204, the second transistor 205, the first resistance 206, the second resistance 207, the third resistance 208, the first motor coil set 209 and the second motor coil set 220 constitute a driving circuit 20'. A PWM signal from a PWM input end is connected to a control input end ST of the driving component 203 via the fourth resistance 221 and the third transistor 222 such that the driving circuit 20' is controlled to produce switch actuating time by means of the duty cycle of the PWM signal being changed in accordance with periodic change of PWM signal. As a result, power of the first motor coil set 218 and the second motor coil set 219 can be controlled for controlling the rotational speed of the fan motor.

Referring to FIG. 3, the third conventional circuit is illustrated. The driving circuit 30' is composed of a reverse voltage protective diode 301, a Hall component 302, a driving component 303, a first transistor 304, a second transistor 305, a first resistance 306, a second resistance 307, a third resistance 308, a first motor coil set 309 and a second motor coil set 320. The PWM signal from a PWM input end passes through the fourth resistance 321 and the third transistor 322 to control "On" and "Off" of the power such that the first motor coil set 309 and the second motor coil set 320, which are connected to collectors of the first transistor 304 and the second transistor 305 respectively, are controlled for changing the rotational speed of the fan motor.

Referring to FIG. 4, wave curves of the PWM signal with respect to time and currents passing through the motor coil sets 309, 320 shown in FIG. 3 with respect to time are illustrated. It can be seen in the figure that once the prior art needs to limit the current level passing through the motor coil sets for meeting different applications, 25 KHZ PWM signal is off till the motor coil current being lower than a preset level due to the driving component performing function of limiting current of protection. In this way, a plurality of 25 KHZ PWM signals becomes disappeared and frequencies of the PWM signals become lower than 20 KHZ such that it results in generation of the noise while the rotational speed of the motor is switched over.

SUMMARY OF THE INVENTION

In order to solve the preceding problems, an object of the present invention is to provide a protect-control device capable of limiting current for reducing noise resulting from switchover of a motor with which the reference level of a sensing unit can be reset to adjust driving level of the motor for obtaining desirable rotational speed of the motor and a range of the rotational speed change.

Another object of the present invention is to provide a protect-control device capable of limiting current for reducing noise resulting from switchover of a motor with which the sensing unit outputs identifying signal to limit driving level of the motor such that variation of frequency of PWM signal can be avoided during the motor running so as to resist noise perceived by human ears.

Accordingly, a protect-control device capable of limiting current for reducing noise resulting from switchover of a motor according to the present invention includes a motor coil set, a driving unit, a sensing unit and a control unit. The motor coil set constitutes a motor. The driving unit is electrically connected to the motor coil set and provides a driving level to pass through the motor coil set for driving the motor. The sensing unit is electrically connected to the motor coil set, provides a preset reference level, detects the driving level, compares the driving level to the preset reference level and outputs an identifying signal. The control unit is electrically connected to the driving unit, the sensing unit and a Hall unit, adjusts the driving level based on the identifying signal for the output of the driving unit being capable of maintaining a basic duty cycle.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 5:
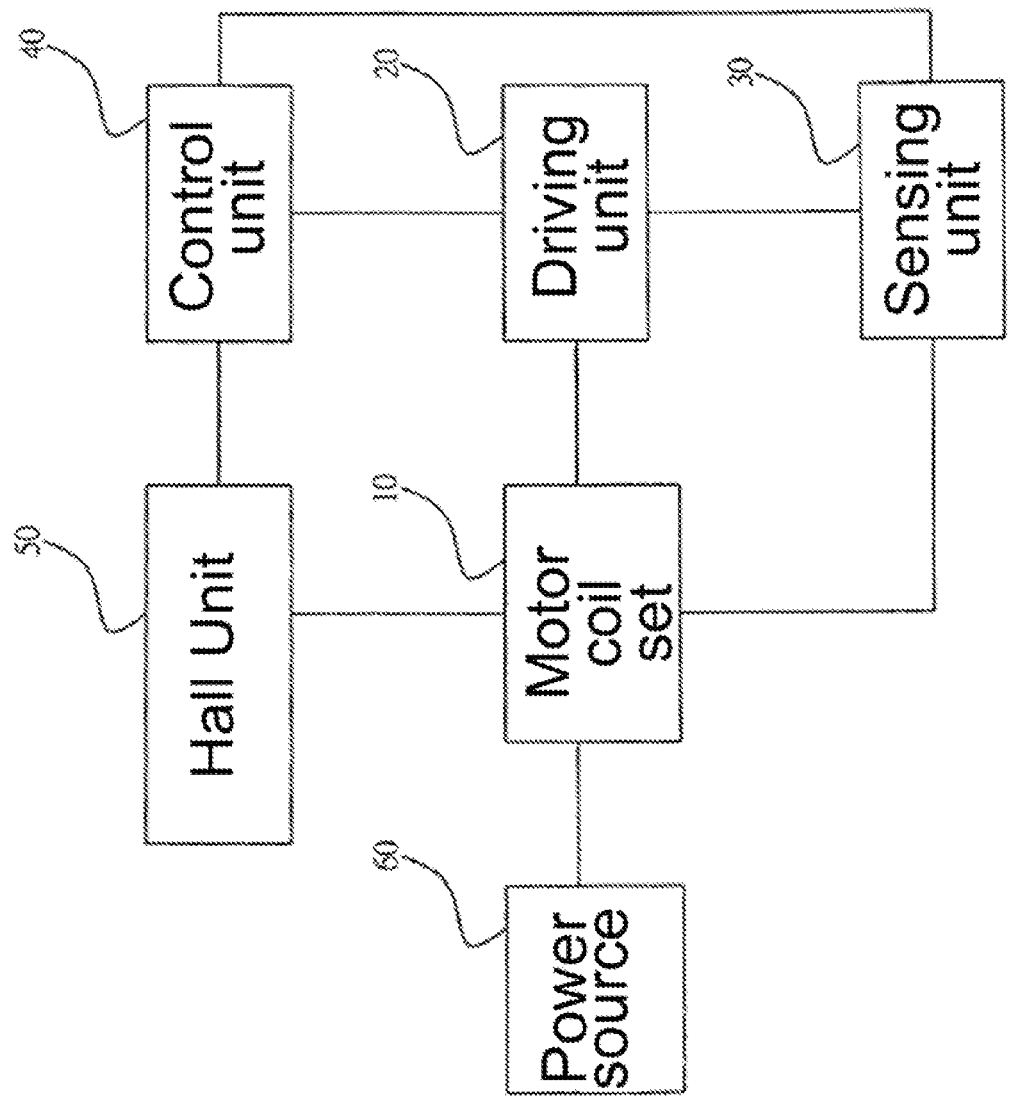
FIG. 5 is a block diagram of a preferred embodiment of a protect-control device capable of limiting current for reducing noise resulting from motor driving according to the present invention.

Referring to FIG. 5, a preferred embodiment of a protect-control device capable of limiting current for reducing noise resulting from motor driving according to the present invention includes a motor coil set 10, a driving unit 20, which is connected to the motor coil set 10 to operate a motor (not shown) constituted by the motor coil set 10, and a sensing unit 30, which is connected to the motor coil set 10 to detect drive level (current and/or voltage) of passing through the motor coil set 10 for comparing to preset reference level, which is arranged in the sensing unit 30 and can be regulated by the user at the time of production, and outputting identifying signal based on the compared result.

Figure 6:
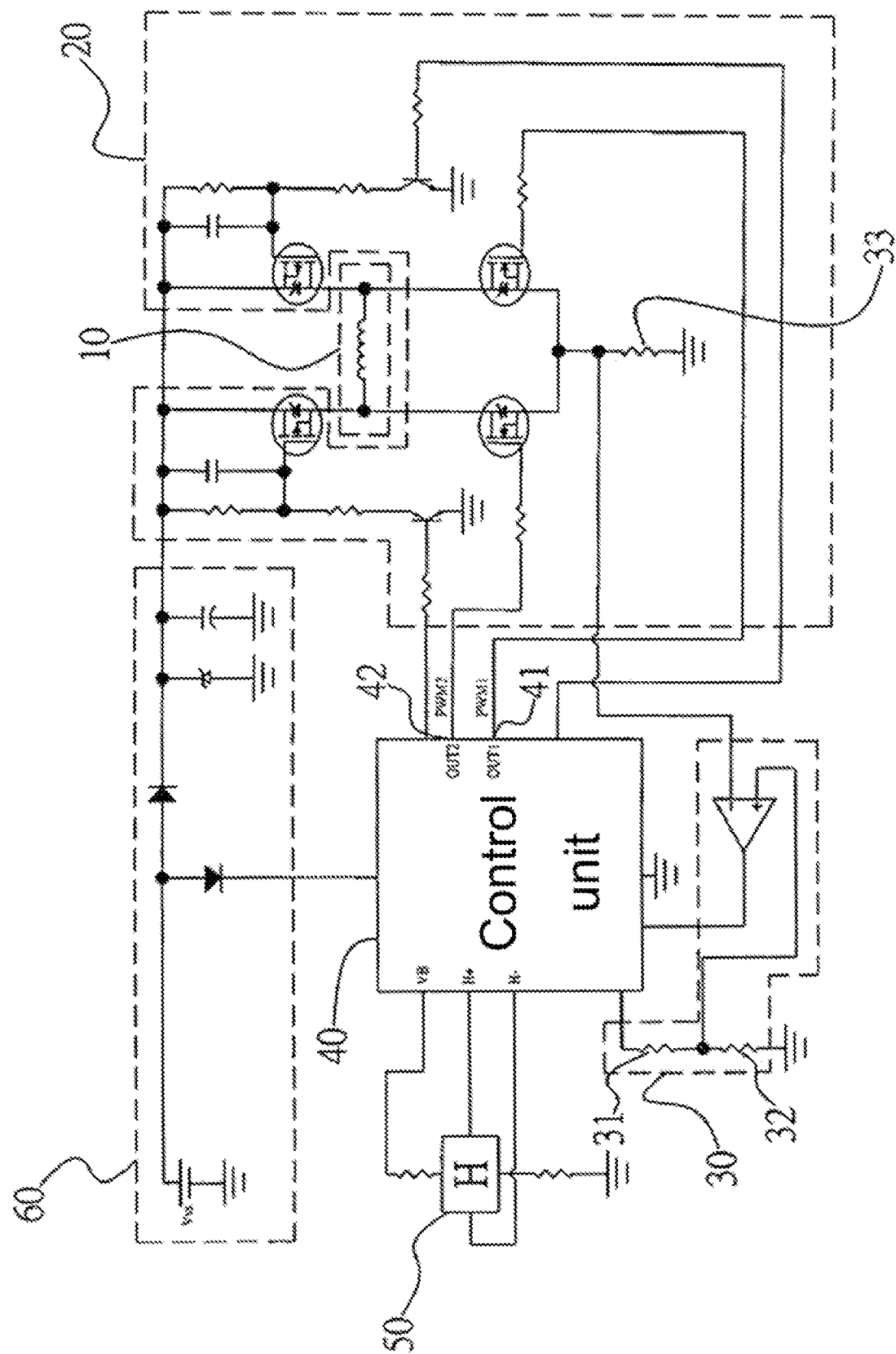
FIGS. 6 and 7 are circuit diagrams for implementing the preferred embodiment of the present invention.
Figure 7:
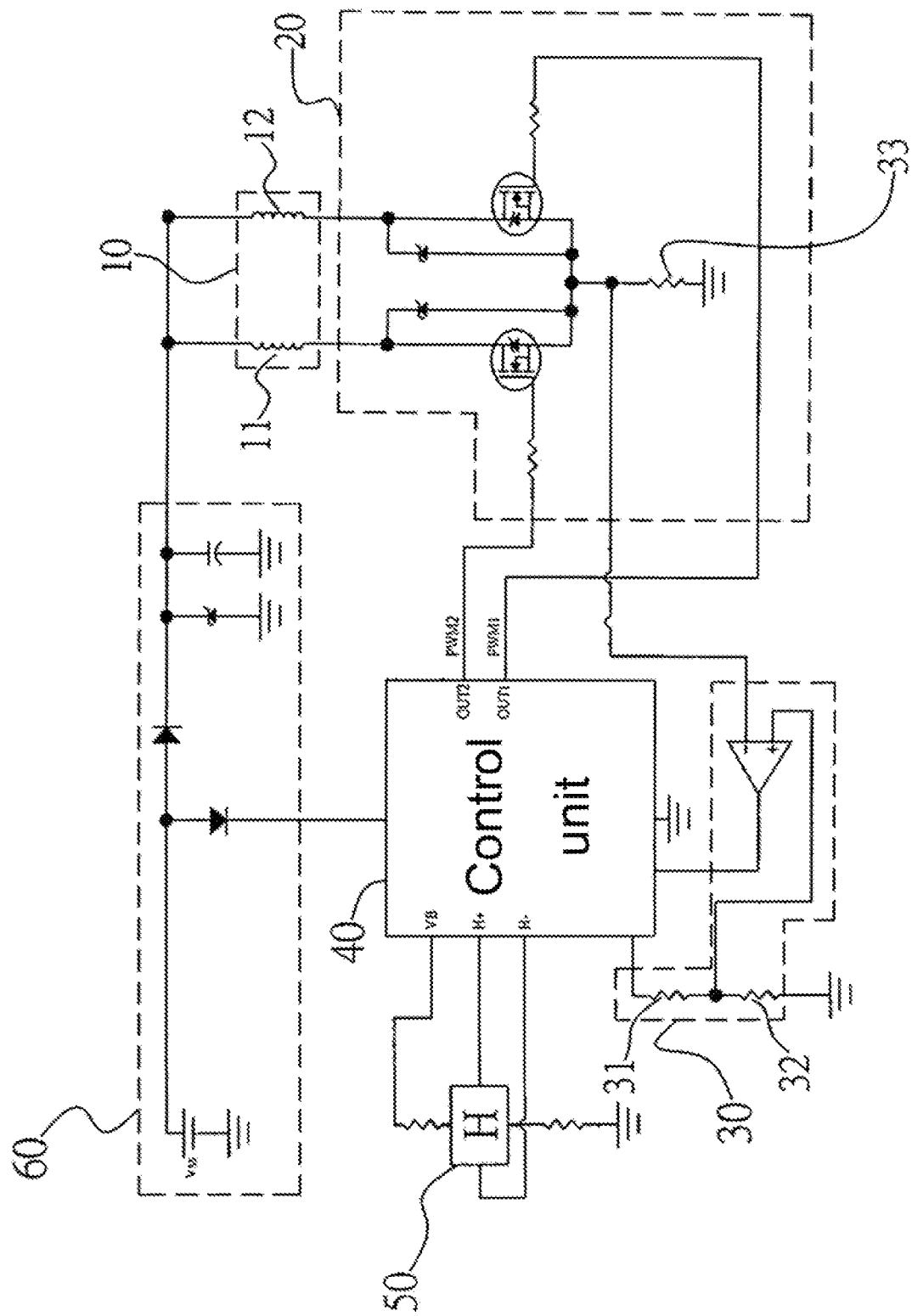
Figure 8:
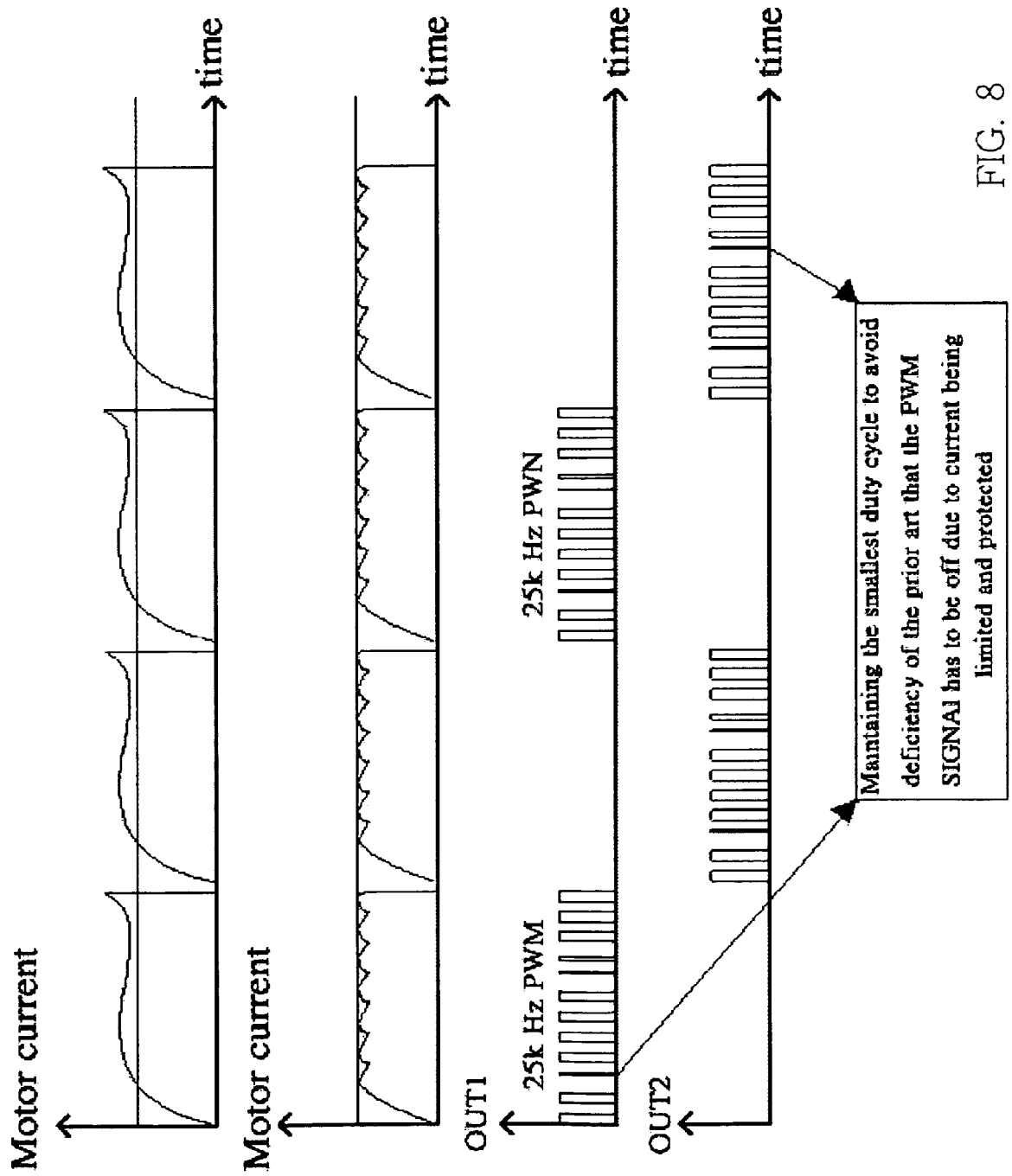
FIG. 8 is a graph illustrating PWM signal and wave curves passing through the motor coil set according to the present invention.

A control unit 40 is electrically connected to the driving unit 20, the sending unit 30 and a Hall component 50. The control unit 40, the motor coil set 10 and the driving unit 20 are electrically connected to a power source 60 for being actuated with required power. The control unit 40 can not only receive the positive voltage signal H+ and the negative voltage signal H−, which are generated from the change of the magnetic pole at the time of the motor running and detected by the Hall component but also adjust the drive level, which is received by the motor coil set 10 from the driving unit 20, based on the identifying signal from the sensing unit 30. In this way, the rotational speed of the motor coil set 10 is capable of varying in a certain range and the driving unit 20 as shown in FIG. 8 is capable of maintaining the smallest duty cycle such as 5% PMW signal and frequency of noise resulting from switch-over of the rotational speed of motor keeps not less than 25 KHZ, which is a value not perceived by human ears. That is, the noise created during switch-over of the rotational speed of motor can be reduced greatly. Referring to FIGS. 6 and 7, the circuits illustrated are applicable for the embodiment of present invention. The control unit 40 provides a first PWM output end 41 and a second PWM output end 42 for supplying the PWM signal to the driving unit 20 and allowing the driving unit 20 to drive the motor coil set 10, which includes the first motor coil 11 and a second motor coil 12 (shown in FIG. 7), during the duty cycle of the PWM signal for running the motor.

Figure 1:
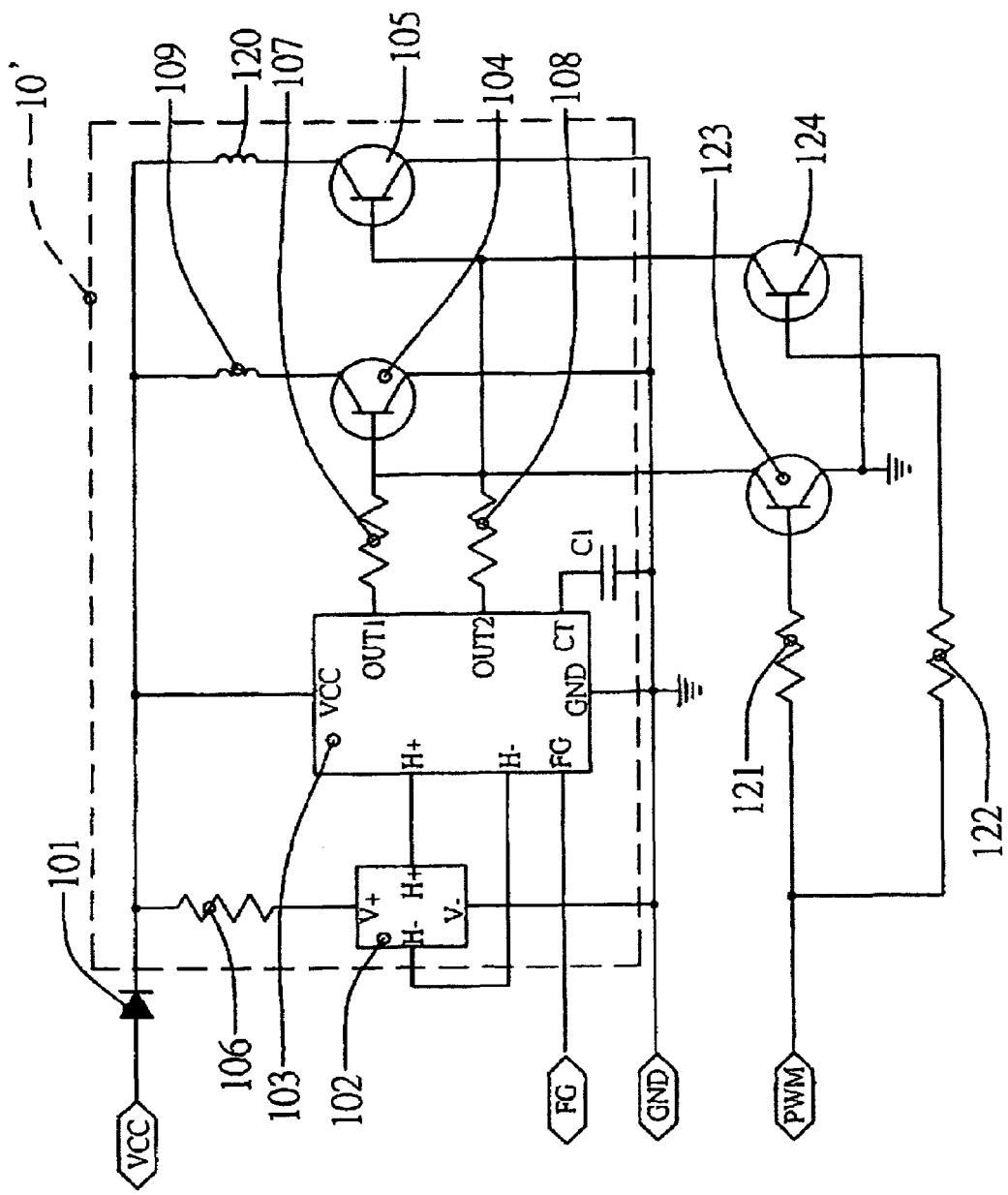
FIG. 1 is the first type conventional circuit diagram.
Figure 2:
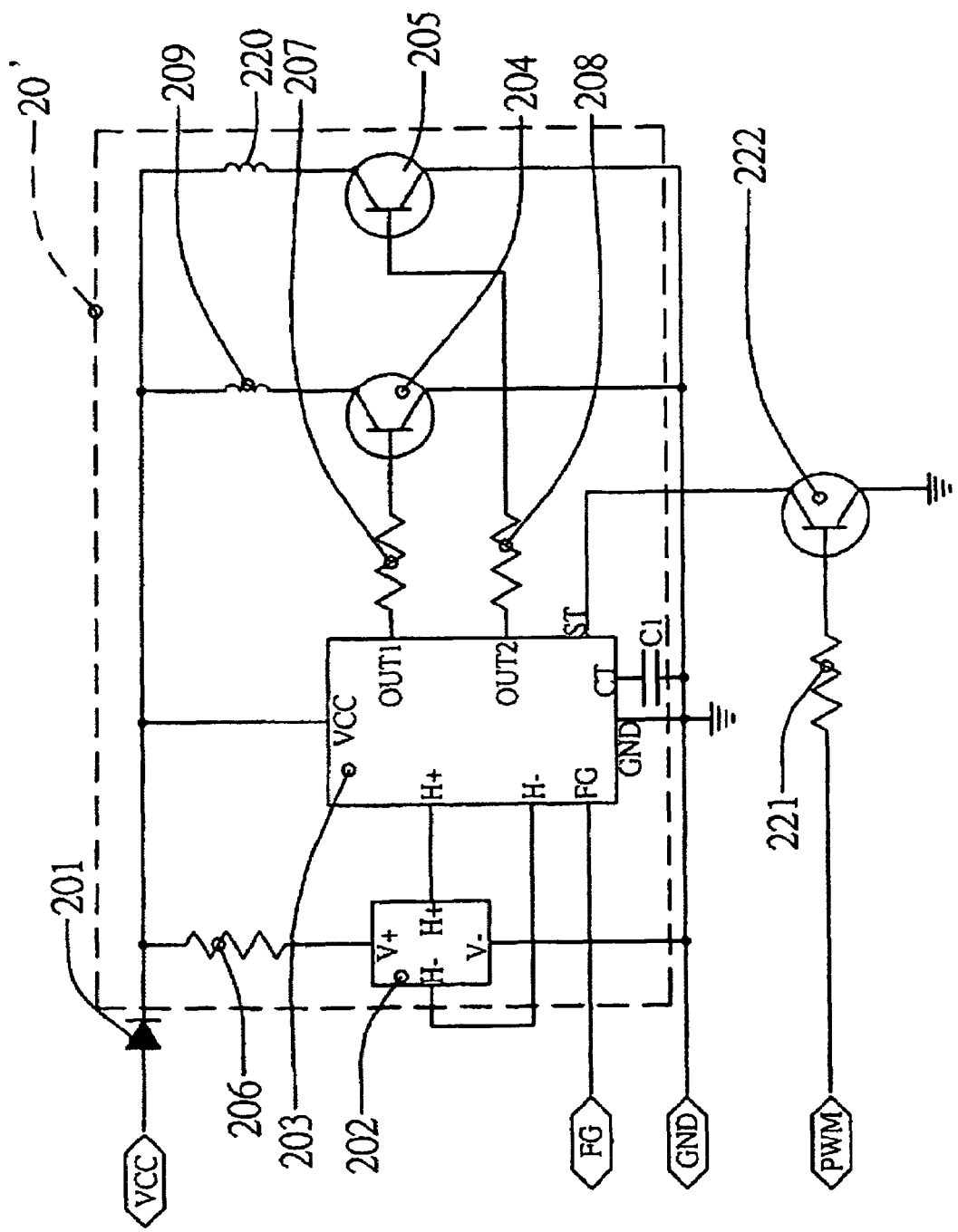
FIG. 2 is the second type conventional circuit diagram.
Figure 3:
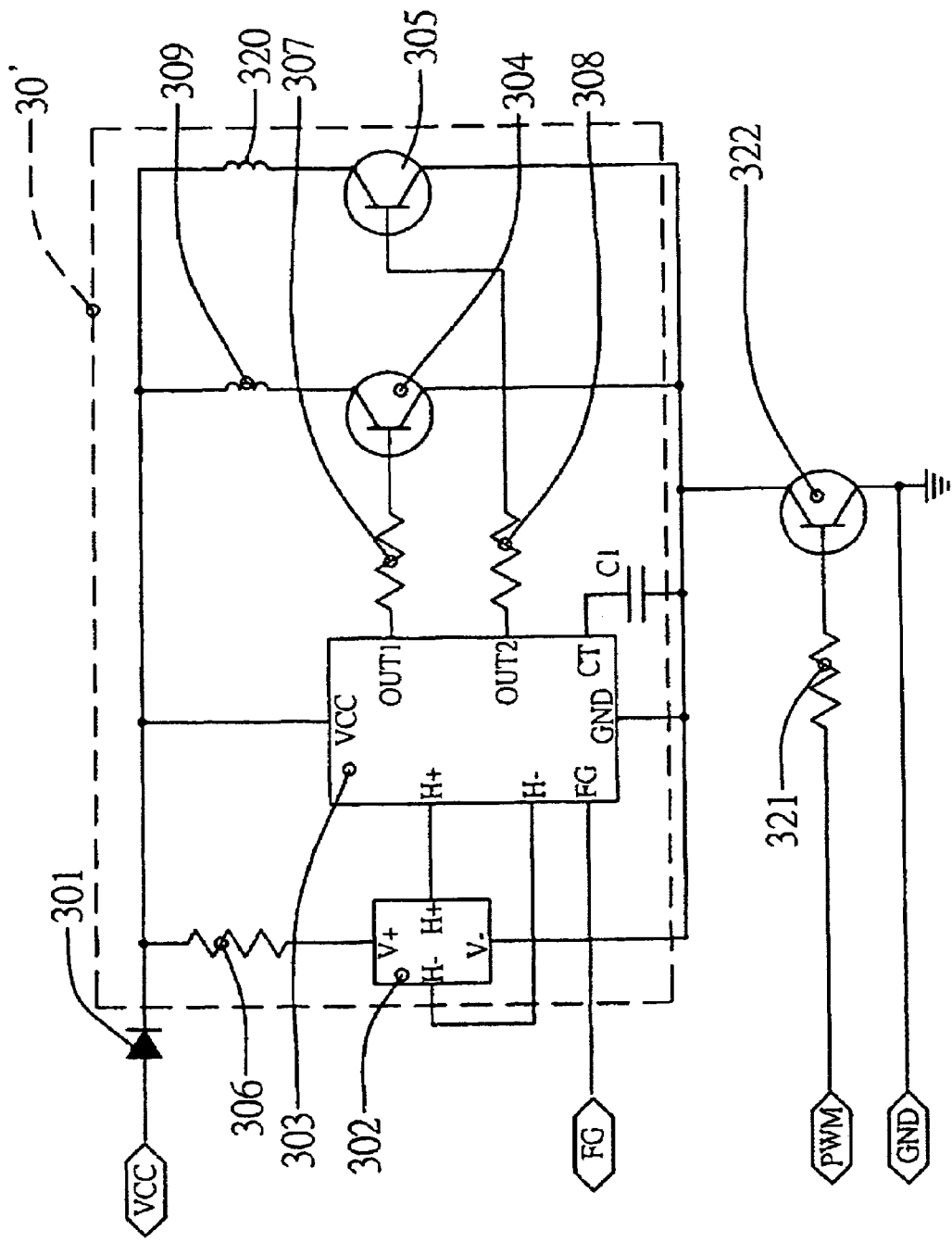
FIG. 3 is the third type conventional circuit diagram.
Figure 4:
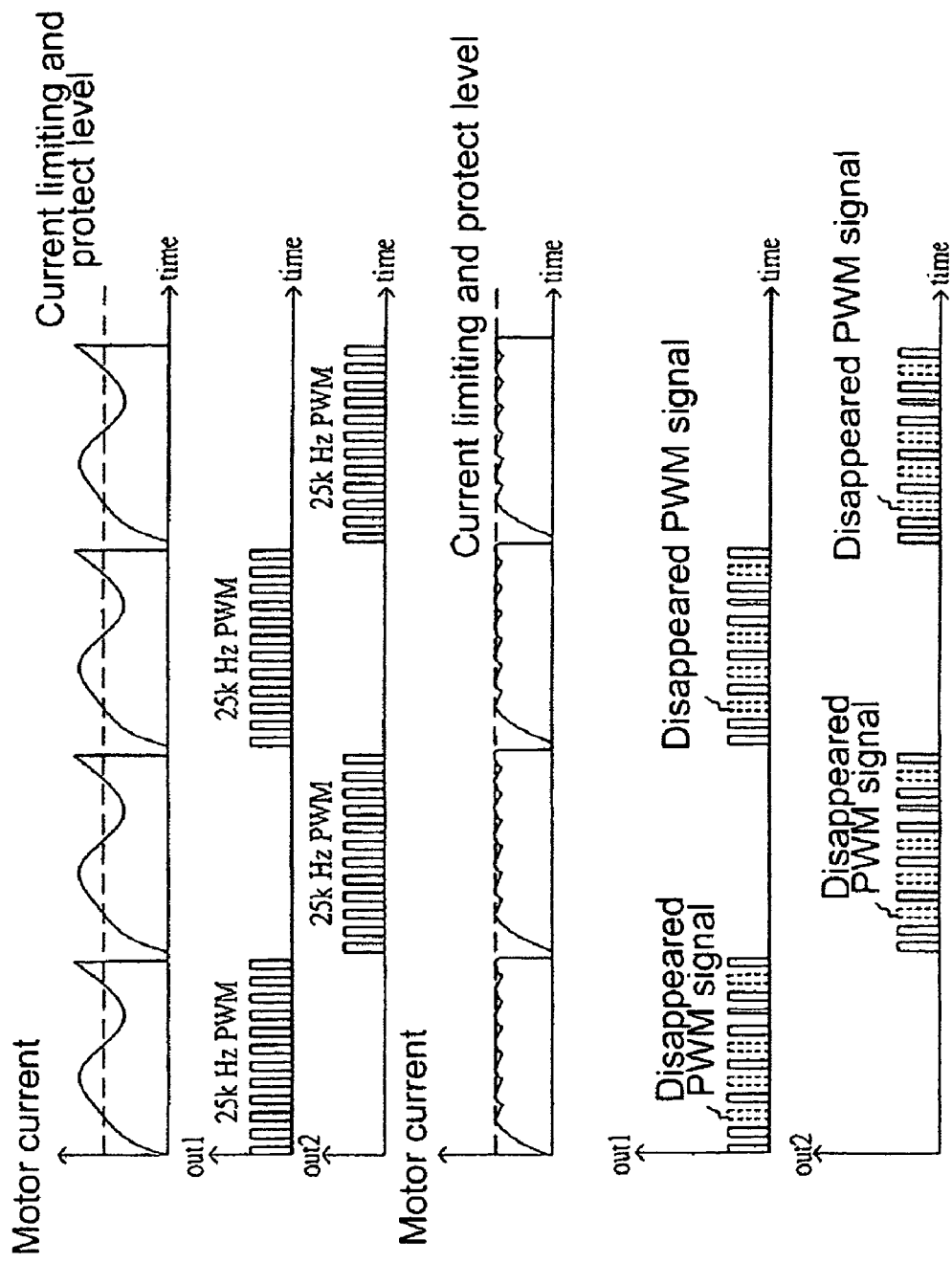
FIG. 4 is a graph illustrating PWM signal and wave curves passing through the motor coil set of the conventional circuit shown in FIG. 3.

In other words, the present invention allows the preset reference level of the sensing unit 30 being regulated simply for limiting drive level passing through the motor coil set 10. For instance, once resistant values of the first resistance 31 and the second resistance 32 of the sensing unit 30 shown in FIGS. 6 and 7 are changed, the effect of different proportional division voltages can be obtained for resetting or changing the preset reference level. In addition, once the control unit 40 receives the identifying signal of the sensing unit 30, which shows the current passing through the motor coil set 10 forming the driving level at the third resistance 33 of the sensing unit 30 not less than the preset reference level, functions of current limit and protection (adjusting or restricting the driving level of the driving unit outputting to the motor coil set) can be performed to overcome the deficiency of the prior art that the PWM signal has to be Off due to current being limited and protected and a plurality of 25 KHZ PWM signals being disappeared such that frequency of PWM becomes lower than 25 KHZ as shown in FIG. 4. Hence, the control unit 40 allows the driving unit 20 to keep the basic duty cycle such as 5% PWM signal pulse width for reducing the noise largely because of the noise generated with switch-over of the rotational speed of the motor being not less than 25 KHZ, the perceived value of human ears.

It is appreciated that protect-control device capable of limiting current for reducing noise resulting from switchover of motor according to the present invention has the following advantages:

1. Due to the driving level of the motor being regulated by means of resetting the reference level of the sensing unit to obtain the rotational speed of a fan motor and range of change of the rotational speed, an error produced by frequency change of the PMW signal is reduced largely and a deviation of the rotational speed is resisted such that the rotational speed being affected by change of the duty cycle of the PMW signal is reduced significantly too.

2. Due to the sensing unit detecting the driving level of the motor and outputting identifying signal to allow the smallest duty cycle of the PMW signal being kept during the control unit changing driving level, the PWM signal sent to the driving unit is not less than 25 KHZ, which is not perceived by the human ears, while the function of current limit and protection being secured.

While the invention has been described with referencing to preferred embodiments thereof, it is to be understood that modifications or variations may be easily made without departing from the spirit of this invention, which is defined by the appended claims.

What is claimed is:

1. A protect-control device capable of limiting current for reducing noise resulting from switchover of a motor comprising:
   a power source;
   a motor coil set constituting a motor;
   a driving unit being electrically connected to the power source and the motor coil and providing a driving level to pass through the motor coil for driving the motor;
   a sensing unit being electrically connected to the motor coil set and having a first resistance with a first resistant value and a second resistance with second resistant value;
   a control unit being electrically connected to the power source, the driving unit and the sensing unit and providing a first PWM output end and a second PMW output end to supply a PWM signal with a duty cycle to the driving unit for the driving unit being capable of driving the motor; and
   a Hall component being electrically connected to the control unit, detecting a positive voltage signal and a negative voltage signal from the motor and sending said positive and negative voltage signals to the control unit;
   wherein the sensing unit provides a preset reference level, which is regulated with a change of said first and second resistant values respectively, detects said driving level, compares said driving level to said preset reference level and outputs an identifying signal to the control unit; and the control unit adjusts said driving level based on said identifying signal for an output signal of the driving unit being capable of maintaining a basic duty cycle, which is much less than the duty cycle of the PMW signal, such that a frequency of a noise resulting from the motor is greater than 25 KHZ, which is not perceived by the human ears.

2. The protect-control device capable of limiting current for reducing noise resulting from switchover of a motor as defined in claim 1, wherein the Hall component and the control unit are joined in an integrated circuit.

3. The protect-control device capable of limiting current for reducing noise resulting from switchover of a motor as defined in claim 1, wherein the driving unit, the Hall component and the control unit are joined in an integrated circuit.

4. The protect-control device capable of limiting current for reducing noise resulting from switchover of a motor as defined in claim 1, wherein the driving unit, the sensing unit, the Hall component and the control unit are joined in an integrated circuit.

\* \* \* \* \*